United States Patent [19]
Cook et al.

[11] Patent Number: 5,513,365
[45] Date of Patent: Apr. 30, 1996

[54] DISPLAY ADAPTER INTERFACE LAYER

[75] Inventors: John A. Cook; Stephanie L. Jensen, both of Austin; James A. Miller, Cedar Park; Gary L. Wiseman, Austin, all of Tex.

[73] Assignee: International Business Machines Corporation, Armonk, N.Y.

[21] Appl. No.: 301,832

[22] Filed: Sep. 6, 1994

Related U.S. Application Data

[63] Continuation of Ser. No. 734,427, Jul. 23, 1991, abandoned.

[51] Int. Cl.⁶ .................................................. G06F 15/00
[52] U.S. Cl. .................... 395/800; 395/309; 364/237.2; 364/239.9; 364/232.91; 364/DIG. 1
[58] Field of Search ................................ 395/800, 275, 395/775, 500, 800, 309; 364/237.2, 239.9, 232.91, DIG. 1

[56] References Cited

U.S. PATENT DOCUMENTS

| | | | |
|---|---|---|---|
| 4,477,695 | 10/1984 | Buck | 178/3 |
| 4,509,113 | 4/1985 | Heath | 395/275 |
| 4,606,001 | 8/1986 | Rieben et al. | 364/474.25 |
| 4,622,633 | 11/1986 | Ceccon et al. | 395/700 |
| 4,855,936 | 8/1989 | Casey et al. | 395/275 |
| 4,858,114 | 8/1989 | Heath et al. | 395/775 |
| 4,965,559 | 10/1990 | Dye | 340/717 |

*Primary Examiner*—Alyssa H. Bowler
*Assistant Examiner*—John Harrity
*Attorney, Agent, or Firm*—Paul S. Drake

[57] ABSTRACT

An apparatus for interfacing between a plurality of application programs and at least one display adapter having functions for supporting a display, the apparatus including first driver apparatus providing an interface from a first one of the application programs to functions of a display adapter, second driver apparatus providing an interface from a second one of the application programs to functions of the display adapter, and access apparatus, coupled to both driver apparatus and to the display adapter, for providing both driver apparatus common access to selected functions of said display adapter. In addition, a method of interfacing between a plurality of application programs and at least one display adapter having functions for supporting a display, the method including the steps of providing a first interface from a first one of the application programs to functions of a display adapter, providing a second interface from a second one of the application programs to functions of the display adapter, and providing common access from the first and second interfaces to selected functions of the display adapter.

15 Claims, 8 Drawing Sheets

1

DISPLAY ADAPTER INTERFACE LAYER

This is a continuation of application Ser. No. 07/734,427 filed Jul. 23, 1991, now abandoned.

RELATED PATENT APPLICATIONS

This patent application is related to patent application Ser. No. 07/734,397 filed Jul. 23, 1991 which was bandoned on Apr. 18, 1994 and continued as application Ser. No. 08/299,075 which was abandoned on Apr. 3, 1995 and continued as application Ser. No. 08/416,586, entitled Multiple Command Set Support for Rendering Components" hereby incorporated by reference; and patent application Ser. No. 07/734,428 filed Jul. 23, 1991 which was abandoned on Nov. 9, 1994 and continued as application Ser. No. 08/336,716, entitled "Display Adapter Supporting Priority Based Functions" hereby incorporated by reference.

TECHNICAL FIELD

The present invention relates generally to display subsystem architecture for use in a computer graphics environment and more specifically to providing a standard display adapter interface.

BACKGROUND ART

FIG. 1 is a block diagram illustrating a typical prior art graphics system with two graphics applications and three display adapters. A first graphics application 100 is shown as a two dimensional (2-D) graphics software package and a second graphics application 110 is shown as a three dimensional (3-D) graphics software package. Both graphics applications 100 and 110 depend on an application programming interface (API) 120 and 130, respectively, for communicating with display adapters 170, 180 and 190. The APIs define the function and control of the display adapters expected by the applications, and provide a more abstract or more powerful method of managing graphics than is possible when programming directly to the display adapters. In the prior art, the APIs 120 and 130 typically contain the code forming the device drivers 126, 132, 134, and 136 for display adapters 170, 180 and 190.

In the prior art, an application program is typically unaware of the flow of information from the API to the display adapter. This simplifies the programming and use of the application program. For example, 2D graphics application 100 communicates to display adapter B 180 by transmitting information through API 120. The API then transmits the information through its internal device driver 126 to the adapter 180. In the prior art, application 100 is typically not aware of data flow between API 120 and internal device driver 126 and between the device driver 126 and the display adapter 180.

FIG. 2 is a block diagram of more recent prior art technology as described in U.S. patent application Ser. No. 07/478,384 filed Feb. 12, 1990 entitled "Display Subsystem Architecture Having a Graphics Adapter Interface" which was abandoned on Jan. 4, 1993 and continued as application Ser. No. 08/000,823 which was abandoned on Nov. 18, 1994 and continued as application Ser. No. 08/341,858. This graphics system may include three graphics applications 200, 205 and 210. In this example, the three graphics applications are MIT's X-Windows, Silicon Graphics, Inc. GL, and IBM's graphics. Each of the applications has been designed to use an appropriate API 220, 225 and 230. The APIs each communicate with a graphics adapter interface (herein referred to as GAI) 300. The APIs each contain and utilize a single GAI driver 221,226, and 231 for communicating with the various device driver libraries 320, 330 and 340 of GAI 300. The GAI device driver libraries 320, 330, 340 then communicate with display adapters 260, 265 and 270. In this example, the device driver libraries are known as the GAI 2-D Library 320, the GAI 3DM1 Library 330, and the GAI 3DM2 Library 340. The GAI libraries each contain and utilize display adapter specific code 321, 322, 323, 331, 332, 333,341, 342, 343 for each display adapter. All of the device specific display drivers within a given GAI device driver library share a common programming interface to a particular API. In the given example, GAI libraries 320, 330 and 340 utilize library interfaces 2-D 325, 3DM1 335 and 3DM2 345.

Each GAI Library contains a number of device specific display drivers. For example, the GAI 2-D Library 320, display drivers 321, 322, and 323 are written for target display adapters 260, 265, and 270, respectively. In the prior art, when an application causes the API to select a GAI Library, the API also selects which display driver in the GAI library is the target. For example, if the GL application 205 was executing on a machine which contained display adapter B 265, then the GL application 205 would use the 3D API 225. The API 225 would contain the GAI device driver 226. The interaction of 226 and the GAI 300 would cause GAI 3DM2 Library 340 to be selected. The programming interface and functionality of the GAI Library 3DM2 340 would be realized in the dynamic binding of the GAI device driver 226 to the device specific code of display driver 342 targeted for display adapter 265.

DISCLOSURE OF THE INVENTION

The present invention includes an apparatus for interfacing between a plurality of application programs and at least one display adapter having functions for supporting a display, the apparatus including first driver means providing an interface from a first one of the application programs to functions of a display adapter, second driver means providing an interface from a second one of the application programs to functions of the display adapter, and access means, coupled to both driver means and to the display adapter, for providing both driver means common access to selected functions of said display adapter.

In addition, the present invention includes a method of interfacing between a plurality of application programs and at least one display adapter having functions for supporting a display, the method including the steps of providing a first interface from a first one of the application programs to functions of a display adapter, providing a second interface from a second one of the application programs to functions of the display adapter, and providing common access from the first and second interfaces to selected functions of the display adapter.

A further understanding of the nature and advantages of the present invention may be realized by reference to the remaining portions of the specification and the drawing.

BEST MODE FOR CARRYING OUT THE INVENTION

Figure 1:
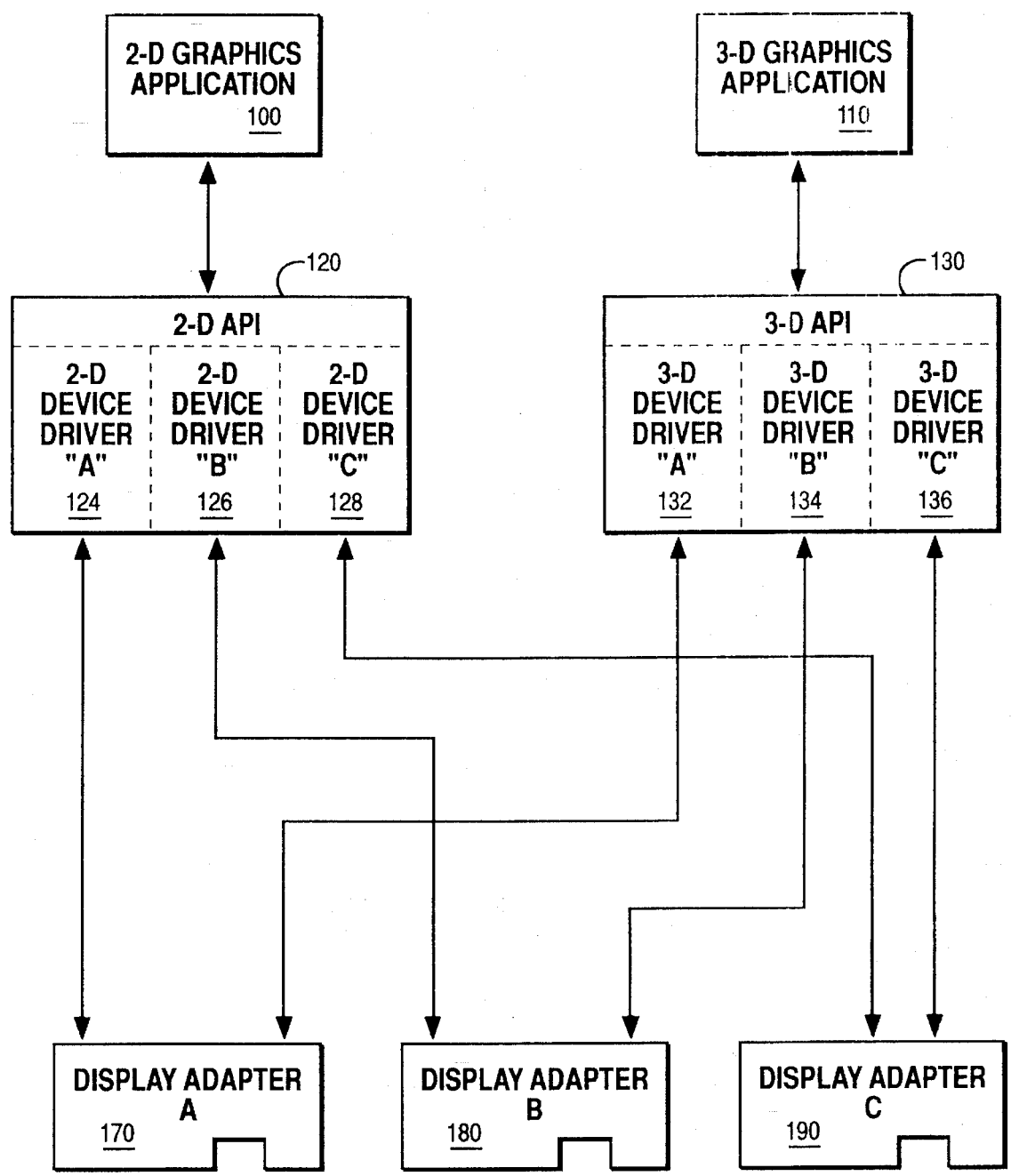
FIG. 1 is a block diagram illustrating a typical prior art graphics system with two graphics application and three display adapters.
Figure 2:
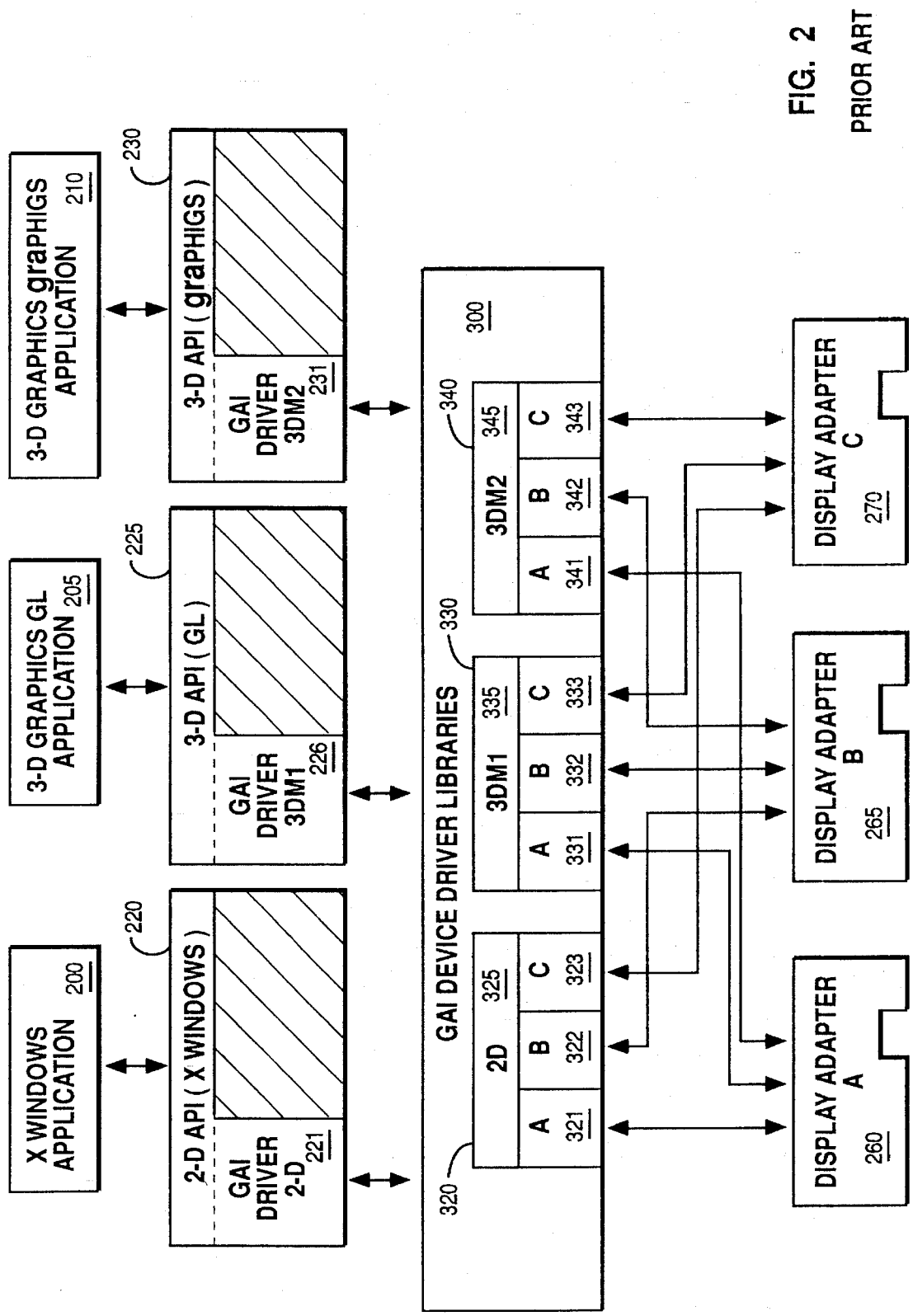
FIG. 2 is a block diagram of more recent prior art graphics system.
Figure 3:
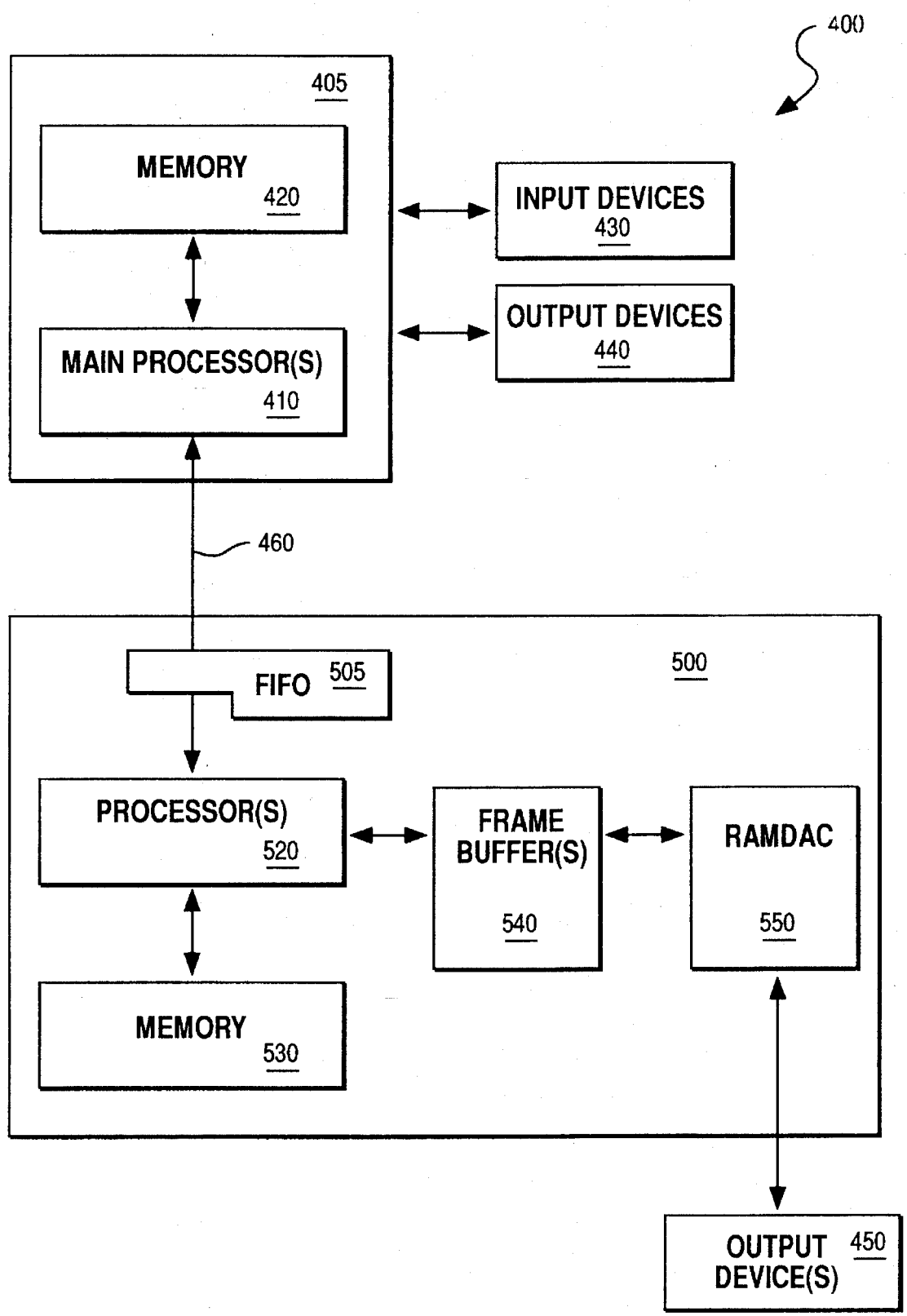
FIG. 3 is a block diagram of a typical digital computer that could utilize a preferred embodiment of the invention.

FIG. 3 is a block diagram of a typical digital computer 400 that could utilize a preferred embodiment of the invention. The computer includes a host computer 405. The host computer includes main processor(s) 410 coupled to a memory 420, input device(s) 430 and output device(s) 440. Main processor(s) 410 may include a single processor or multiple processors. Input device(s) 430 may include a keyboard, mouse, tablet or other type of input devices. Output device(s) 440 may include a text monitor, plotter or other types of output devices. The main processor may also be coupled to output device(s) 450 such as a graphics display through a display adapter 500. The display adapter 500 receives instructions regarding graphics from main processor 410 on bus 460. These instructions may be temporarily stored in a FIFO (first in, first out) queue 505. The display adapter then executes those instructions with adapter processor(s) 520 coupled to adapter memory 530. The display adapter includes a set of functions that it can perform in response to instructions from the host processor. These functions are generally in the form of microcode instructions in adapter memory and executed by adapter processors. These functions can include rendering a primitive on the display. The adapter processor(s) then execute(s) those instructions and updates frame buffer(s) 540 based on those instructions. Frame buffer(s) 540 includes data for every pixel to be displayed on the output device. A RAMDAC (random access memory digital-to-analog converter) 550 converts the digital data stored in the frame buffers into RGB signals to be provided to the display 450, thereby rendering the desired output from the main processor.

Figure 4:
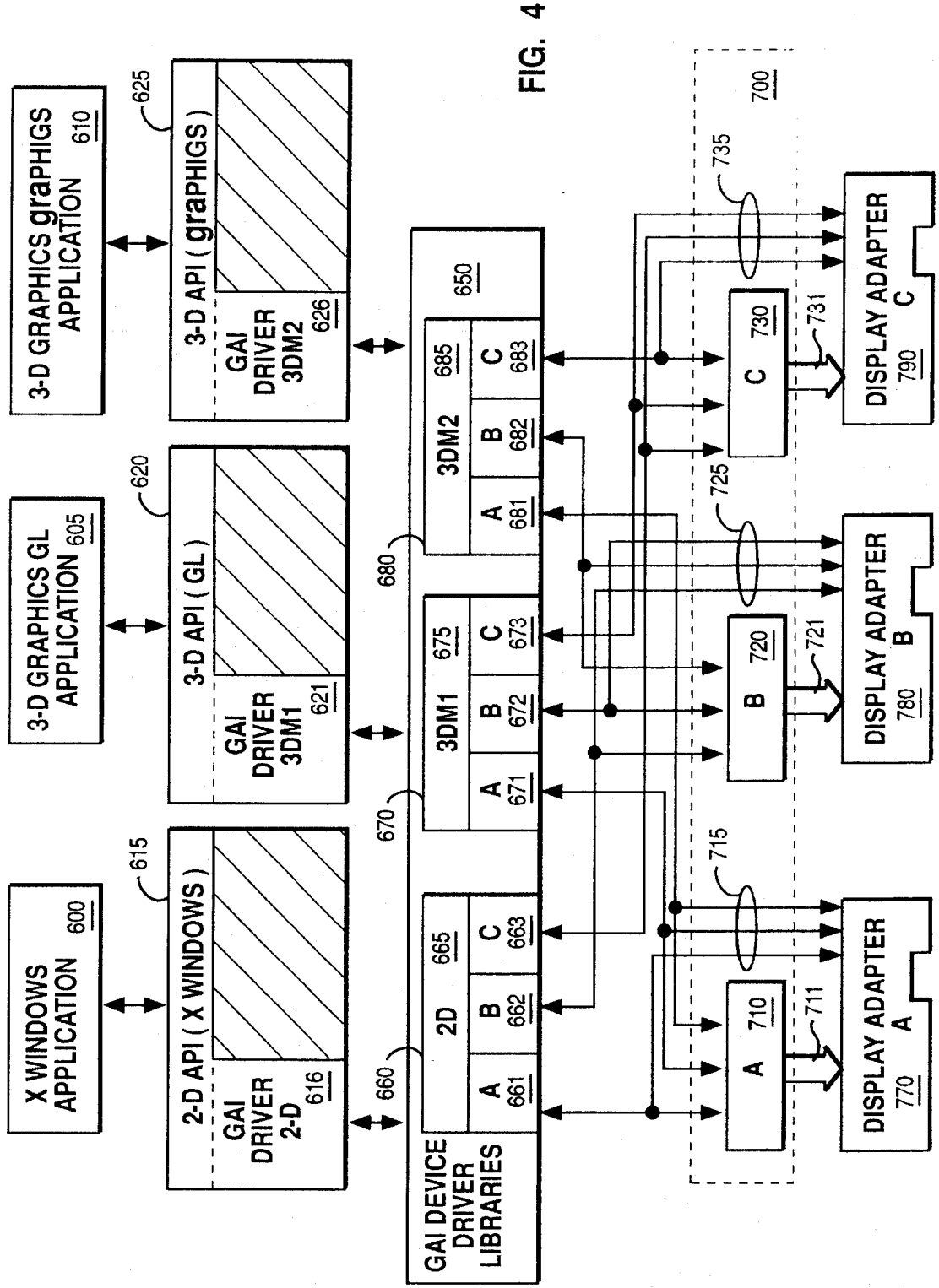
FIG. 4 is a block diagram of a graphics system utilizing a preferred embodiment of the invention.

FIG. 4 is a block diagram of a graphics system utilizing a preferred embodiment of the invention. The graphics system in this embodiment includes three applications 600, 605 and 610 with respective APIs 615, 620 and 625. In this example, the three applications are MIT's X-Windows, Silicon Graphics, Inc., GL and IBM's graPHIGS. The APIs contain and utilize GAI drivers 616, 621 and 626 to communicate and dynamically bind with GAI device driver libraries 660, 670 and 680 located in GAI 650. Each of the GAI device driver libraries includes a library interface 665, 675 and 685 for providing communications between the APIs and the device drivers.

An adapter interface layer 700 is provided between the GAI and display adapters 770, 780, and 790. The device specific code contained within the GAI display drivers 661, 662, 663, 671, 672, 673, 681, 682, and 683 are programmed to interface with and utilize adapter interface layer 700 to access the display adapter functions on signal lines 711, 721 and 731. However, the GAI may communicate to the display adapters without utilizing the adapter interface layer with signal lines 715, 725 and 735, thereby providing flexibility in building device drivers. The adapter interface layer includes three sets of code 710, 720 and 730, each set being written for utilizing a particular display adapter. Each of these sets of code, herein referred to as routines, includes pieces of code, macros, subroutines and/or programs for utilizing the respective display adapters 770, 780, 790.

In the current example, there are three display device drivers 663, 673, and 683 in the GAI 650 which contain software that is device specific and intended for display adapter 790. Each of these three display drivers uses the same adapter interface layer 730. Programmers working in teams can reuse and interchange software between the constituent portions of 663, 673, and 683 because the methods of accessing the same display adapter are common. When changes to display adapter 790 arise, the changes need only be manifested in a revision of the adapter interface layer 730. When sophisticated techniques arise, for optimizing the interchange of data between the display drivers and the display adapter, the techniques can be placed in a routine and used by a community of programmers, rather than having to be designed into each separate display driver.

In the preferred embodiment, routines 710, 720, and 730 are compiled into the respective device drivers for each adapter during device driver compilation. As a result, each of the device drivers obtains the necessary code for utilizing and interfacing with a display adapter during compilation rather than during run time. Alternative embodiments may utilize separate routines from the display adapters to be utilized only during run time. Various examples of these routines, their uses, and alternative embodiments will be explained in greater detail below.

Figure 5:
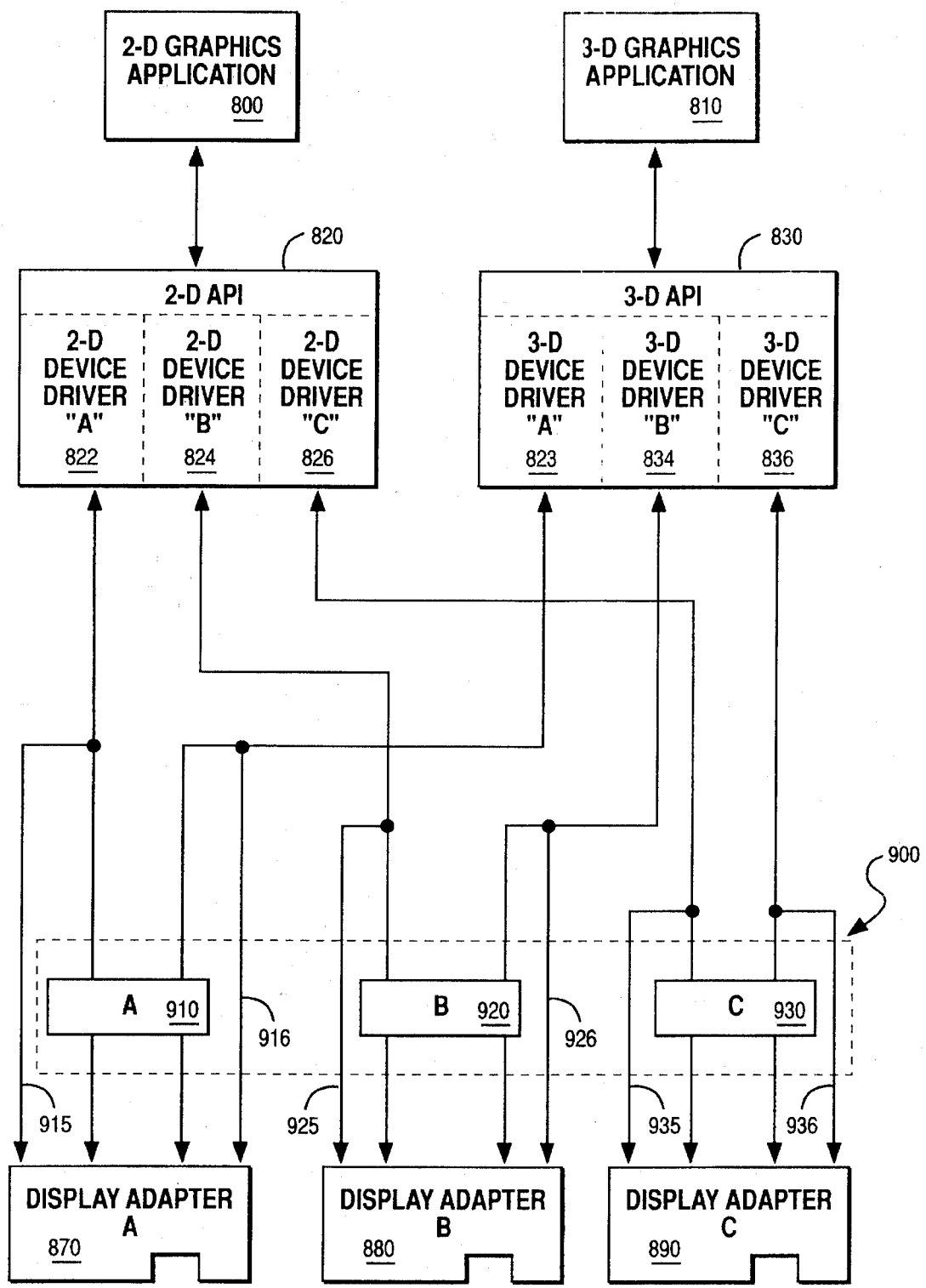
FIG. 5 is a block diagram of an alternate use of the adapter interface layer.

FIG. 5 is a block diagram of an alternate use of the adapter interface layer. The graphic system in this embodiment includes two applications 800 and 810 with respective APIs 820 and 830. In this example, the first application is a 2-D graphic system and the second application is a 3-D graphic system. Each of the respective APIs includes a device driver 822, 824, 826, 832, 834, 836 for the three display adapters 870, 880 and 890.

An adapter interface layer 900 is provided between the device drivers and the display adapters. The device drivers are programmed to interface with and utilize adapter interface layer 900 to access the display adapter functions. However, the device drivers may communicate to the display adapters without utilizing the adapter interface layer on signal lines 915, 916, 925, 926, 935 and 936, thereby providing flexibility in building device drivers. The adapter interface layer includes three sets of code 910, 920 and 930, each set being written for utilizing a particular adapter. Each of these sets of code, herein referred to as routines, includes pieces of code, macros, subroutines and/or programs for utilizing the respective display adapters 870, 880, and 890.

Figure 6:
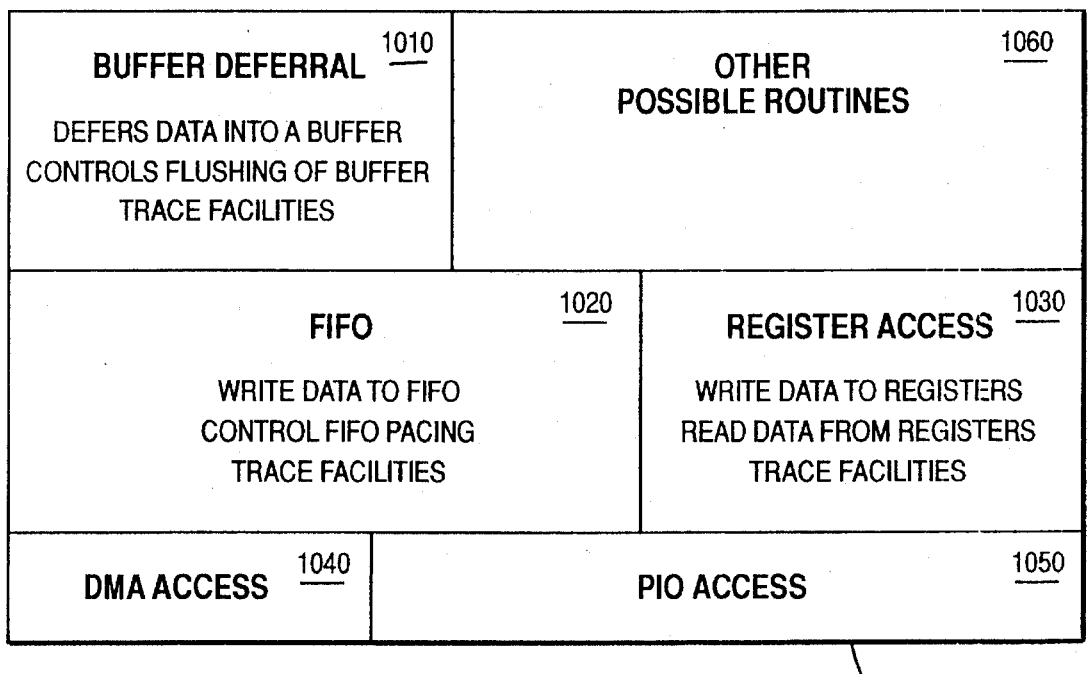
FIG. 6 is a block diagram illustrating the types of code that may be included in an adapter interface layer.

FIG. 6 is a block diagram illustrating the types of code that may be included in an adapter interface layer 1000 such as adapter interface layer 700 of FIG. 4 or adapter interface layer 900 of FIG. 5. This embodiment includes a buffer deferral routine 1010, FIFO routine 1020, register access routine 1030, DMA access routine 1040 and PIO access routine 1050. Other routines 1060 may be included.

A buffer deferral routine 1010 may be provided for deferring data being passed to the display adapter. In some systems, transfers of small quantities of data across a bus from the host computer to the display adapter are very inefficient with respect to transfers of larger quantities of data. As a result, the writing of the data may be deferred in the hopes of aggregating large amounts before writing the data across the bus. A buffer deferral routine 1010 may be utilized to defer data into a buffer and control flushing of the buffer. Trace facilities may also be provided to aid in debugging and performance tuning of the system. The buffer deferral routine may be used separately by each device driver or a common buffer may be shared among the device drivers for each adapter by using conventional programming techniques.

A FIFO (first in, first out) routine 1020 may be provided for moving data to the display adapter without overflowing or underflowing a FIFO queue on the display adapter. Some adapters utilize a specially designed FIFO queue for storing incoming data for execution by the adapter. There are bus programming considerations that should be followed to move data without overflow or underflow of the FIFO queue in the adapter. A more detailed explanation of the use of FIFOs in a display adapter is given in patent application Ser. No. 07/480,181 filed Feb. 12, 1990 entitled "First-In/First-Out Buffer Queue Management for Multiple Processes" hereby incorporated by reference. A set of macros may be used to control the pacing of the FIFO and to add other system software considerations to the control of the FIFO queue. The FIFO routine 1020 writes data to the display adapter FIFO queue 505, controls FIFO pacing and may also provide trace facilities for use in debugging and performance tuning of the system.

A register access routine 1030 may be provided for writing and reading data stored in registers in the adapter in a quick and efficient manner. This routine may also provide trace facilities for use in debugging and performance tuning of the system. A Direct Memory Access (DMA) facility or routine 1040 may be included to provide the capability to transfer information to the display adapter from the GAI, or API when no GAI is utilized using DMA facilities. Similarly, a bus memory programmed input/output (PIO) routine 1050 may be provided as another low level access feature, much like that provided in the bus register access routine 1030. Other routines 1060 may also be included in the adapter interface layer 1000.

Figure 7:
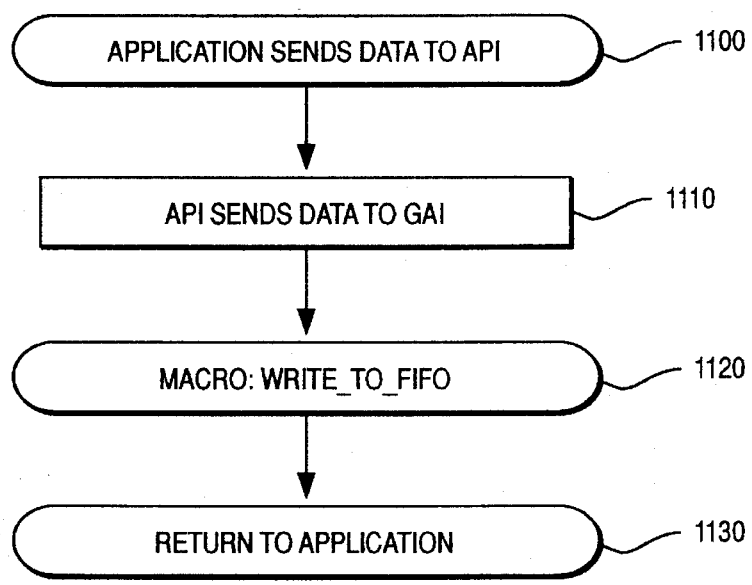
FIGS. 7–10 are flowcharts illustrating the use of the present invention.

FIG. 7 is a flowchart illustrating the use of the present invention to provide common high level control for the optimization of data interchange between the host computer and the display adapter. This flowchart illustrates the use of some of the routines included in the adapter interface described in FIG. 6 above. In a first step 1100, the application sends an instruction for execution by the display adapter to the API. In a second step 1110, the API then sends the instruction to the GAI which then utilizes the adapter interface layer routines. In step 1120, a WRITE_TO_FIFO macro is executed by the GAI. This macro causes instructions and data to be written to the adapter FIFO in an efficient manner while addressing FIFO overflow and underflow conditions. This involves accessing and utilizing several adapter functions during the loading of the adapter FIFO. This macro is very adapter specific and is appropriately located in the adapter interface layer in the preferred embodiment. This macro is described in greater detail in FIGS. 8–10 below. Upon completion of step 1120, a return signal is returned to the application in step 1130.

Figure 8:
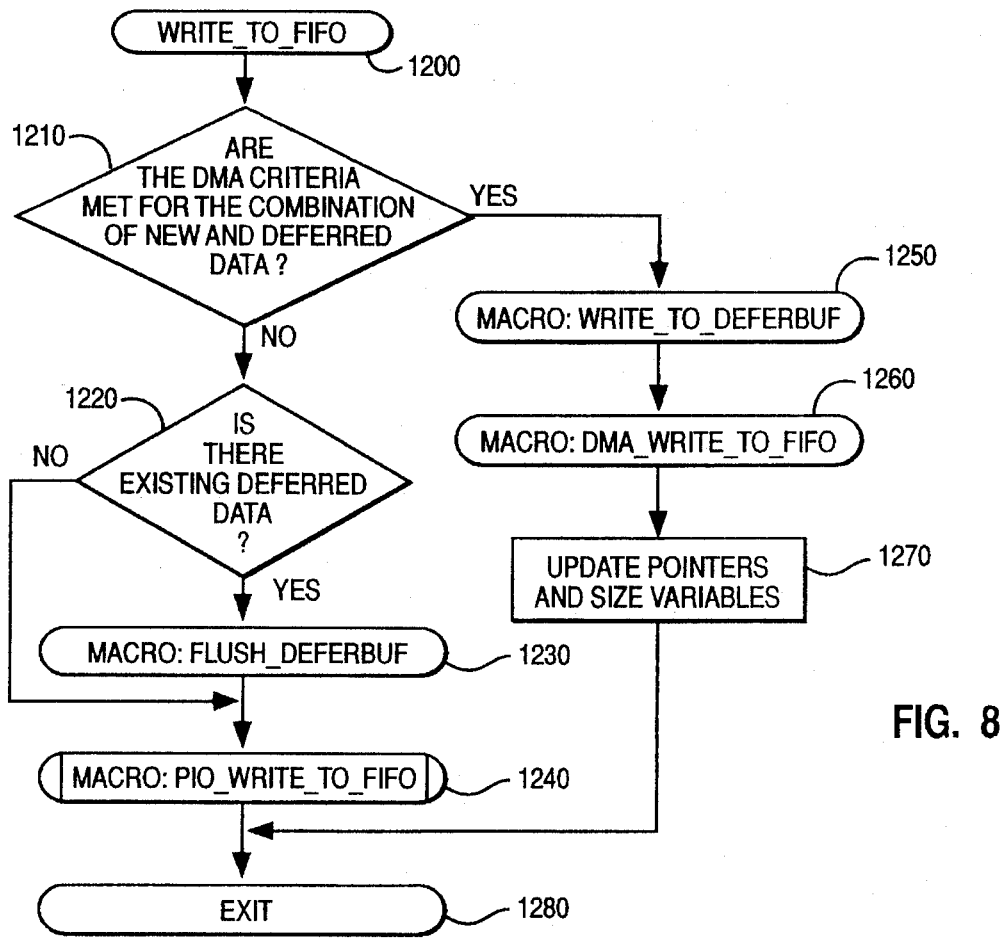

FIG. 8 is a flowchart illustrating the WRITE_TO_FIFO macro described in FIG. 7 above. The WRITE_TO_FIFO macro is initiated in step 1200. In step 1210, it is determined whether certain criteria is met for transferring data, included previously deferred data, by DMA to the adapter. If no, then in step 1220, it is determined whether there is any existing deferred data. If yes to step 1220, then the FLUSH_DEFERBUF macro is executed at 1230. This macro causes a deferral buffer containing information to be sent to the adapter to be cleared by efficiently sending the information to the adapter for execution. This macro is described in greater detail in FIG. 10 below. If no to step 1220 or upon completion of step 1230, a PIO_WRITE_TO_FIFO macro is executed in step 1240. This macro writes information to the adapter FIFO while handling various FIFO conditions. If yes to the step 1210, then in step 1250 a WRITE_TO_DEFERBUF macro is executed. This macro accumulates instructions and data that are to be sent to the adapter to be accumulated in a deferral buffer. This allows for efficient writing of blocks of information from the host computer to the adapter. The deferral buffer is generally located in the host computer memory. This macro is described in greater detail in FIG. 9 below. Subsequently, a DMA_WRITE_TO_FIFO macro is executed in step 1260. This macro writes information to the adapter FIFO while handling various FIFO conditions. In step 1270 appropriate pointers and size variables in host computer memory are updated. In step 1280, execution is returned to step 1120 of FIG. 7.

Figure 9:
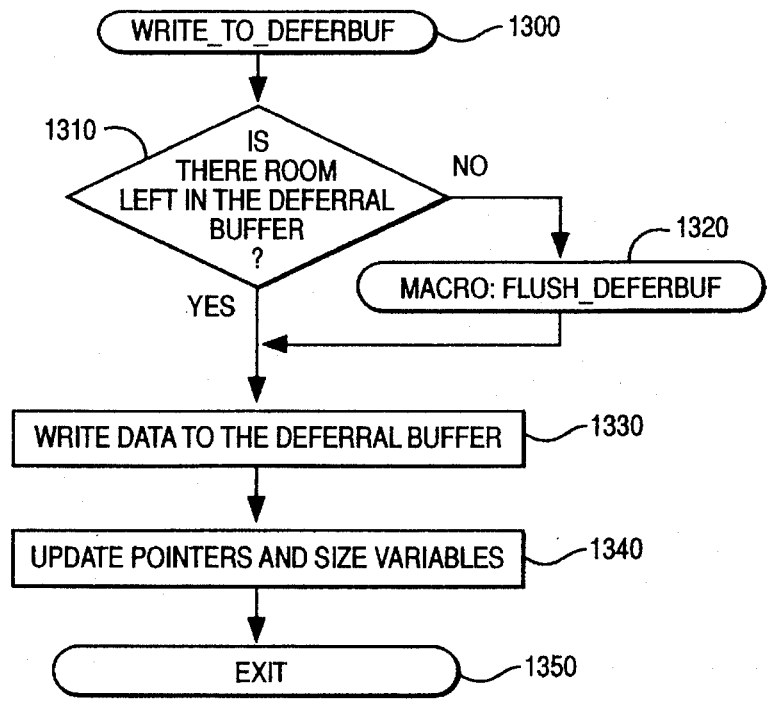

FIG. 9 is a flowchart of the WRITE_TO_DEFERBUF macro described above. In step 1300, the WRITE_TO_DEFERBUF macro is initiated. In step 1310, it is determined whether room is left in the deferral buffer for storing more incoming data. If no, then in step 1320 a FLUSH_DEFERBUF macro is executed. If yes, or upon completion of step 1320, data is written to the deferral buffer in step 1330. In step 1340, the appropriate pointers and size variables are updated. In step 1350, execution is returned to the step that called this macro.

Figure 10:
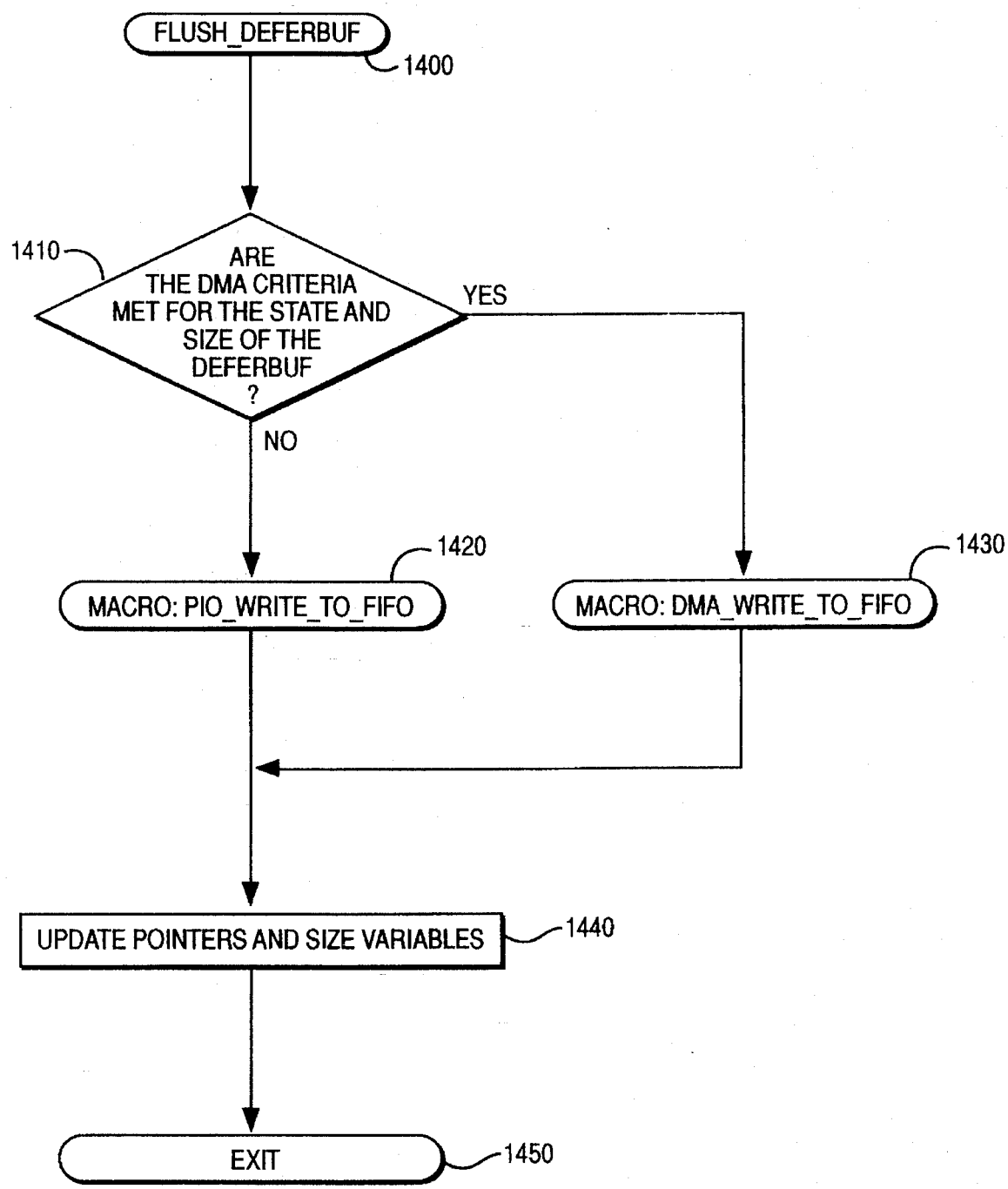

FIG. 10 is a flowchart describing the FLUSH_DEFERBUF macro described above. In step 1400, the FLUSH_DEFERBUF routine is initialized. In step 1410, it is determined whether the criteria are met for sending the data via DMA. If yes, then a DMA_WRITE_TO_FIFO macro is executed in step 1430. If no, then to step 1410, then in step 1420 a PIO_WRITE_TO_FIFO is executed. Subsequent to steps 1420 or 1430, the appropriate pointers and size variables are updated in step 1440. In step 1450, the execution is then returned to the routine that called this macro.

The present invention provides for many advantages over the prior art. The adapter interface layer provides for standardization of many of the functions previously performed by the device drivers. As a result, new applications and/or new display adapters may be ported to a computer system with less effort than previously needed. In addition, the common adapter interface layer facilities or routines can provide for sophisticated and coordinated functions such as buffer deferral or tracing. The present invention also provides for easier maintenance of the computer system. Furthermore, the adapter interface layer routines may be written by a programmer more knowledgeable of the display adapter rather than the individual display driver programmer. This results in less errors, quicker porting of new applications, and more efficient programming.

Although the present invention has been fully described above with reference to specific embodiments, other alternate embodiments may be apparent to those of ordinary skill in the art. For example applications involving image processing or video capture and playback may utilize the present invention. Therefore the above description should not be taken as limiting the scope of the present invention which is defined by the appended claims.

We claim:

1. An apparatus for interfacing between a plurality of application programs and a plurality of display adapters, each of said display adapters having a plurality of functions for supporting a display, the apparatus comprising:

a) first driver means providing a first interface from a first one of said application programs to functions of a first display adapter;

b) second driver means providing a second interface from a second one of said application programs to functions of said first display adapter;

c) third driver means providing a fourth interface from said first application program to functions of a second display adapter;

d) fourth driver means providing a fifth interface from said second application program to functions of said second display adapter; and e) access means, coupled to each driver means and to each said display adapter, for providing a third interface from all of said application programs to less than all functions of said first display adapter, and for providing a sixth interface from all of said application programs to less than all functions of said second display adapter such that some functions of the second display adapter are not accessible by the application programs through the sixth interface.

2. The apparatus of claim 1 wherein said access means includes storage means for storing requests, received from at least one of said driver means, to access less than all functions of said first display adapter.

3. The apparatus of claim 2 wherein said access means includes means for providing direct memory access from said first application program to said first display adapter.

4. The apparatus of claim 3 wherein said access means includes tracing means for tracing requests received from said driver means.

5. The apparatus of claim 1 further comprising application program interface means for providing a common interface from said first application program to said first and third driver means.

6. A method of interfacing between a plurality of application programs and a plurality of display adapters, each of said display adapters having a plurality of functions for supporting a display, the method comprising the steps of:

a) providing a first interface from a first one of said application programs to functions of a first display adapter;

b) providing a second interface from a second one of said application programs to functions of said first display adapter;

c) providing a fourth interface from said first application program to functions of a second display adapter;

d) providing a fifth interface from said second application program to functions of said second display adapter; and e) providing a third interface from all of said application programs to less than all functions of said first display adapter and providing a sixth interface from all of said application programs to less than all functions of said second display adapter such that some functions of the second display adapter are not accessible by the application programs through the sixth interface.

7. The method of claim 6 wherein said step of providing common access includes storing requests, received from at least one of said driver means, to access less than all functions of said first display adapter.

8. The method of claim 7 wherein said step of accessing includes providing direct memory access from said first application program to said first display adapter.

9. The method of claim 8 wherein said step of accessing includes tracing requests received from at least one of said driver means.

10. The method of claim 6 further comprising the step of providing a common interface from said first application program to said first and third driver means.

11. A data processing system comprising:

a) a first display adapter having functions for supporting a first display and a second display adapter, each display adapter having a plurality of functions for supporting a second display; and b) a host computer including:

i) first and second application programs;

ii) first driver means providing a first interface from said first application program to functions of said first display adapter;

iii) second driver means providing a second interface from said second application programs to functions of said first display adapter; and iv) third driver means providing a fourth interface from said first application program to functions of said second display adapter;

v) fourth driver means providing a fifth interface from said second application program to functions of said second display adapter; and vi) access means, coupled to each said driver means and to each said display adapter, for providing a third interface from all of said application programs to less than all functions of said first display adapter, and for providing a sixth interface from all of said application programs to less than all functions of said second display adapter such that some functions of the second display adapter are not accessible by the application programs through the sixth interface.

12. The system of claim 11 wherein said access means includes storage means for storing requests, received from at least one of said driver means, to access less than all functions of said display adapter.

13. The system of claim 12 wherein said access means includes means for providing direct memory access from said first application program to said display adapter.

14. The system of claim 13 wherein said access means includes tracing means for tracing requests received from said driver means.

15. The system of claim 11 wherein said host computer further includes application program interface means for providing a common interface from said first application program to said first and third driver means.

\* \* \* \* \*